(12) United States Patent
Yamada (10) Patent No.: US 6,330,089 B1
(45) Date of Patent: Dec. 11, 2001

(54) OPTICAL TIME-DIVISION MULTIPLEXING TRANSMITTER MODULE

(75) Inventor: Hiromi Yamada, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/170,213

(22) Filed: Oct. 13, 1998

(30) Foreign Application Priority Data

Oct. 13, 1997 (JP) .................................................... 9-278921

(51) Int. Cl.[7] .................................................. H04J 14/00
(52) U.S. Cl. ........................ 359/115; 359/175; 359/140; 359/127; 359/180; 359/181; 359/188
(58) Field of Search ................................. 359/175, 140, 359/127, 180, 181, 188, 115

(56) References Cited

U.S. PATENT DOCUMENTS

| | | | |
|---|---|---|---|
| 5,615,037 | * 3/1997 | Betts et al. | 359/188 |
| 5,781,003 | * 7/1998 | Kondo | 324/96 |
| 5,796,764 | * 8/1998 | Corsini et al. | 372/6 |
| 5,835,646 | * 11/1998 | Yoshikawa | 385/14 |
| 5,889,607 | * 3/1999 | Suzuki et al. | 359/245 |
| 5,926,297 | * 7/1999 | Ishikawa et al. | 359/115 |

FOREIGN PATENT DOCUMENTS

11160663-A * 6/1999 (JP) .

OTHER PUBLICATIONS

20Git/s, 8100km Straight–line Single–Channel Solution–based RZ Transmission Experiment Using Periodic Dispersion Compensation. pp. 983–986.

* cited by examiner

Primary Examiner—Leslie Pascal
Assistant Examiner—Chau M. Nguyen
(74) Attorney, Agent, or Firm—Rabin & Berdo, P.C.

(57) ABSTRACT

An optical time-division multiplexing transmitter module which includes an optical circulator, an optical coupler which splits in two an optical signal in the form of a pulse beam output from the circulator, first and second double-pass electro-absorption (DPEA) modulators positioned respectively to receive and modulate one and the other of the two split signals, and reflect the modulated signals back through the coupler to the circulator. The coupler multiplexes the reflected signals and directs the multiplexed signals to the circulator which then guides them to exit through a circulator output port. An optical delay circuit is positioned between in the path of one of the split signals so as to delay it relative to the other.

23 Claims, 6 Drawing Sheets

OPTICAL TIME-DIVISION MULTIPLEXING TRANSMITTER MODULE

FIELD OF THE INVENTION

The present invention relates to an optical transmitter module for time-division multiplexing in an optical communication field.

BACKGROUND OF THE INVENTION

A conventional optical time-division multiplexing (OTDM) system is described, for example, in Proceedings of the 21st European Conference on Optical Communications (ECOC '95-Brussels) Th. A. 3. 5, pp. 983–986. An optical transmitter described in this publication has an optical signal (clock) generator which includes a laser diode and an optical electro-absorption (EA) modulator and generates a 10 Gbit/s pulse beam.

In the conventional transmitter, an RZ (return-to-zero) pulse train signal from the optical signal generator is split into two signals via an optical coupler. Then the split signals are modulated by an LiNbO$_3$ modulator. After one of the modulated signals is delayed, both signals are multiplexed via another optical coupler.

There are some problems with the conventional optical time-division multiplexing transmitter module. Since the conventional transmitter employs an LiNbO$_3$ modulator for modulating the optical signals, it is difficult to minimize the overall module size. In the case of employing a relatively smaller EA modulator instead of the LiNbO$_3$ modulator, connections between its input/output ports and other components require optical fibers, which prevents further size reduction. Moreover, especially in the case of a multi-tap module with a PLC substrate (a planer lightwave circuit formed on a semiconductor substrate), it is difficult to align optical axes of EA modulator chips and the PLC substrate.

SUMMARY OF THE INVENTION

It is therefore an object of the invention to solve the above-described problems to provide an optical time-division multiplexing transmitter module which is compact and makes alignment of the optical axes easy.

According to the present invention, there is provided an optical time-division multiplexing transmitter module which includes an optical circulator, an optical coupler which splits in two an optical signal in the form of a pulse beam output from the circulator, first and second double-pass electro-absorption (DPEA) modulators positioned respectively to receive and modulate one and the other of the two split signals, and reflect the modulated signals back through the coupler to the circulator. The coupler multiplexes the reflected signals and directs the multiplexed signals to the circular which then guides them to exit through a circulator output port. An optical delay circuit is positioned between in the path of one of the split signals so as to delay it relative to the other.

By employing DPEA modulators, the number of optical components is reduced thereby making it is possible to make the module more compact. Further, according to the invention, compared to the prior art, it is easy to align the optical axes.

BRIEF DESCRIPTION OF THE DRAWING

The objects and features of the invention will become more apparent from the consideration of the following detailed description, taken in conjunction with the accompanying drawings in which.

DESCRIPTION OF THE PREFERRED EMBODIMENTS

<The first embodiment>

Figure 1:
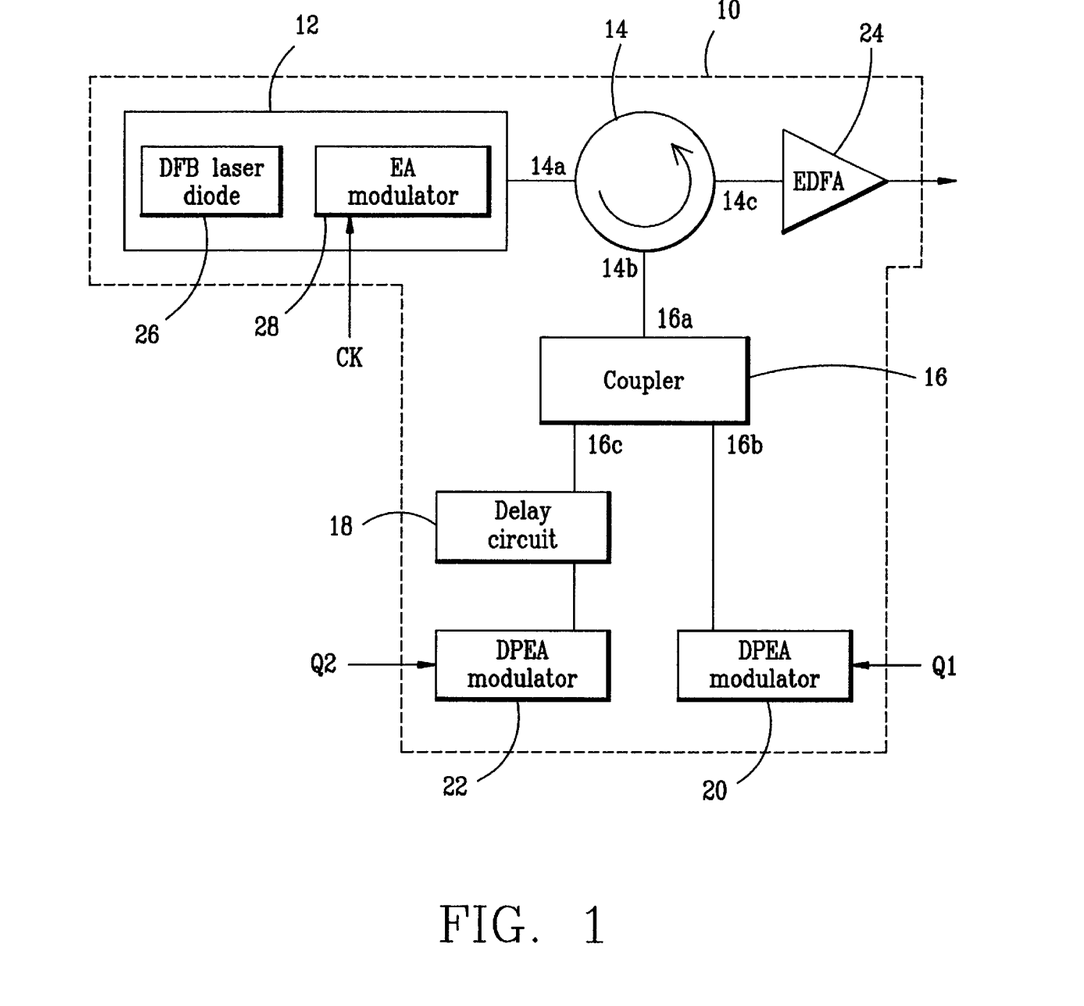
FIG. 1 is a schematic diagram of a first embodiment according to the invention.

FIG. 1 is a schematic diagram of the first embodiment. In FIG. 1, an optical transmitter 10 includes an optical signal generator 12, an optical circulator 14, an optical coupler 16, a first optical double-pass electro-absorption (DPEA) modulator 20, a second optical DPEA modulator 22, an optical delay circuit 18 and an optical amplifier 24.

The optical signal generator 12 has a DFB (distributed-feedback) laser diode 26 and an electro-absorption (EA) modulator 28. In the first embodiment, an EDFA (Erbium-doped fiber amplifier) is employed as the optical amplifier 24. The optical circulator 24 has a first port 14a coupled to the generator 12, a second port 14b coupled to the coupler 16 and a third port 14c coupled to the EDFA 24. The coupler 16 couples the second port 14b of the circulator 14 to the first modulation 20 along a first path and to the second modulation 22 through the delay circuit 18 along a second path.

An optical signal from the signal generator 12 enters the first port 14a of the optical circulator 14. The optical signal exits the optical circulator through the second port 14b and is sequentially split by the optical coupler 16 into one split signal which enters the first optical DPEA modulator 20 and another signal split signal that enters the second optical DPEA modulator 22 through the optical delay circuit 18.

The first and second optical DPEA modulators 20, 22 modulate the split optical signals and reflect them back toward the second port 14b of the circulator 14 through the coupler. The DPEA modulators 20, 22 modulate the optical signals twice, that is, both before and after the reflection. Finally, the optical signal is guided to the third port 14c of the circulator 14 and exits the transmitter through the EDFA 24.

The optical signal generator 12 generates optical signals in the form of a pulse beam whose power oscillates at a prescribed frequency. As described, the signal generator 12 includes the DFB laser diode 26 and the EA modulator 28. The DFB laser diode 26 emits a laser beam. The EA modulator 28 modulates the laser beam at the prescribed frequency to form the pulse beam. The frequency of the modulation of the laser beam is controlled by an externally generated clock signal CK applied to the EA modulator 28, so that the pulse beam is synchronized with the frequency period (e.g. 10 GHz) of the clock signal CK.

Figure 2:
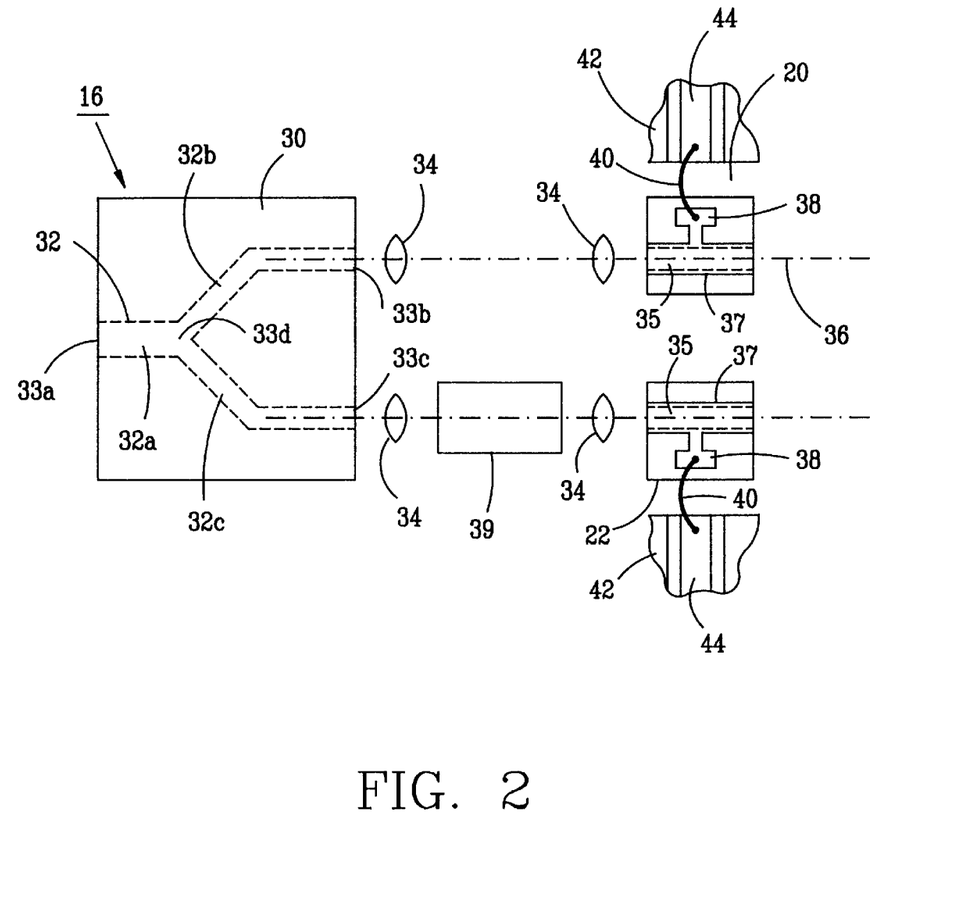
FIG. 2 is a schematic plan view of the first embodiment.

The optical coupler 16 is preferably an optical waveguide as shown in FIG. 2. As described below, the optical coupler 16 is preferably formed on a silicon substrate.

Externally generated electric signals Q1 and Q2 are respectively applied to the DPEA modulators 20 and 22 in order to synchronously control their modulating of the split signals.

The optical delay circuit 18 provides a delay (a phase difference) between the split optical signals before they enter the first and second DPEA modulators 20, 22 and then again (to double the delay) when the modulators reflect the signals back.

The optical signal exiting the circulator 14 through the third port 14c, is amplified by the optical amplifier 24, before exiting the transmitter. In this embodiment, the amplified optical signal is emitted by the transmitter 10 so as to propagate to an optical receiving set while carrying data at 20 Gbit/s.

Referring again to the plan view of FIG. 2, the optical coupler 16, lenses 34 and the DPEA modulators 20, 22, are arranged along optical axes 36. The optical coupler 16 is formed on silicon substrates 30 as an optical waveguide (core) 32 fabricated by depositing $SiO_2$ with a controlled refractive index, on the silicon substrate.

In this embodiment, the optical coupler 16 is a Y-shaped optical waveguide 32 which includes linear waveguide portions 32a, 32b and 32c which respectively connect the coupler portions 33a, 33b, and 33c to a common node 33d. Thus, the optical signal exiting through the circular port 14b enters the Y-shaped waveguide 32 at the coupler port 33a, and at the node 33d splits into two parts to travel in separate directions along waveguide portions 32b and 32c to exit the waveguide 32 at the coupler ports 33b and 33c before reaching the delay circuit 18 and the DPEA modulators 20, 22, as described below.

The optical delay circuit 18 may be an optical fiber 39 formed between the third port 33c of the optical coupler 16 and the second DPEA modulator 22. Four lenses 34 are provided at suitable positions between the optical coupler 16 and the DPEA modulators 20, 22 in order to focus the optical signals onto the DPEA modulators. The DPEA modulators 20, 22, the optical coupler 16, the optical fiber 39 and the lenses 34 are arranged along the optical axes 36. The DPEA modulators 20, 22 each include an optical waveguide 35 which are formed on separate substrates along the respective optical axes 36. Conductive lines 37 are provided over the waveguides 35, and are electrically connected to respective bonding pads 38. Separate (one each at the input and output of each modulator) DC bias supply substrates 42 for supplying DC voltage, are disposed adjacent to each of the modulators 20, 22. The bonding pad 38 of each modulator is electrically connected to a respective separate bias supply line 44 by a corresponding bonding wire 40.

<The second embodiment>

Figure 3:
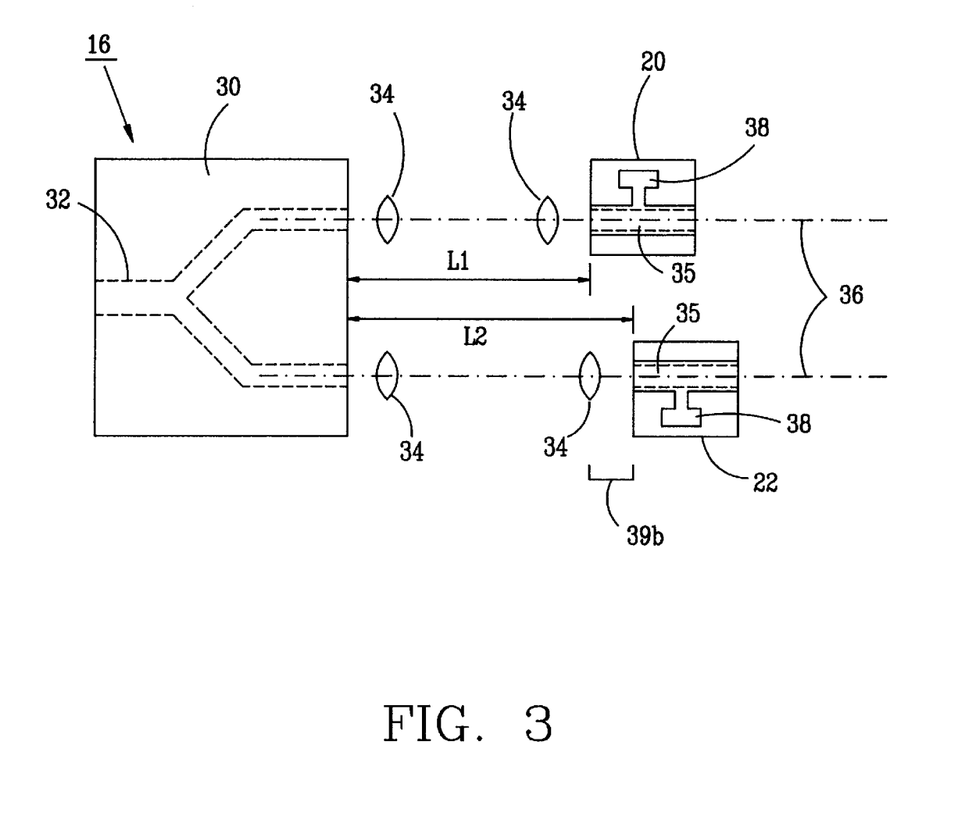
FIG. 3 is a schematic plan view of a second embodiment according to the invention.

FIG. 3 is a plan view of a portion of an optical time-division multiplexing (OTDM) system according to the second embodiment of the invention. In FIG. 3, the DPEA modulators 20, 22 are provided at different distances from the optical coupler 16. The distance L2 between the modulator 22 and the coupler 16 is longer than the distance L1 between the modulator 20 and the coupler 16. Therefore, the phase of the split signal traveling the longer distance L2 to the modulator 22 is delayed relative to that of the split signal reaching the modulator 20. Thus, in this embodiment, additional space 39b before the modulator 22 serves as the optical delay circuit. However, in this second embodiment, the delay of the optical signal is actually obtained without a physical component as required in the first embodiment. Otherwise, this embodiment is substantially the same as the first embodiment. Thus, fewer parts and optical alignments are required in the second embodiment.

<The third embodiment>

Figure 4:
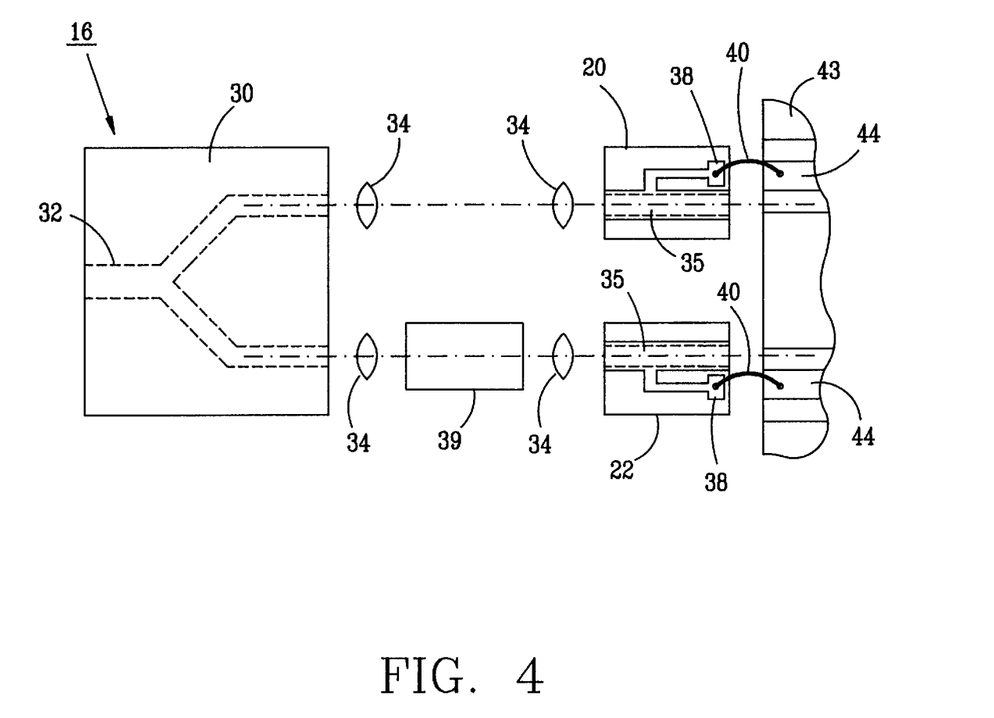
FIG. 4 is a schematic plan view of a third embodiment according to the invention.

FIG. 4 is a plan view of a portion of the third embodiment of the invention. In contrast to the arrangements of the first and second embodiments illustrated in FIGS. 2 and 3 wherein two separate DC bias supply substrates 42 are provided at laterally opposite sides of the transmitter, in FIG. 4, a single DC bias supply substrate 43 is provided adjacent to the DPEA modulators 20, 22, on the side thereof longitudinally opposite to the optical coupler 16.

In this third embodiment, the respective bonding pads 38 of the DPEA modulators 20, 22 are located close to the DC bias supply substrate 43. Thus, it is easy to connect both bonding pads 38 to the respective two bias supply lines 44 on the one DC bias supply substrate with the bonding wires 40.

Moreover, although metalized portions of the modulators, including the bonding pads 38, are larger than those of the first embodiment, the capacitances and inductances thereof are more stable since shorter bonding wires may be used.

<The fourth embodiment>

Figure 5:
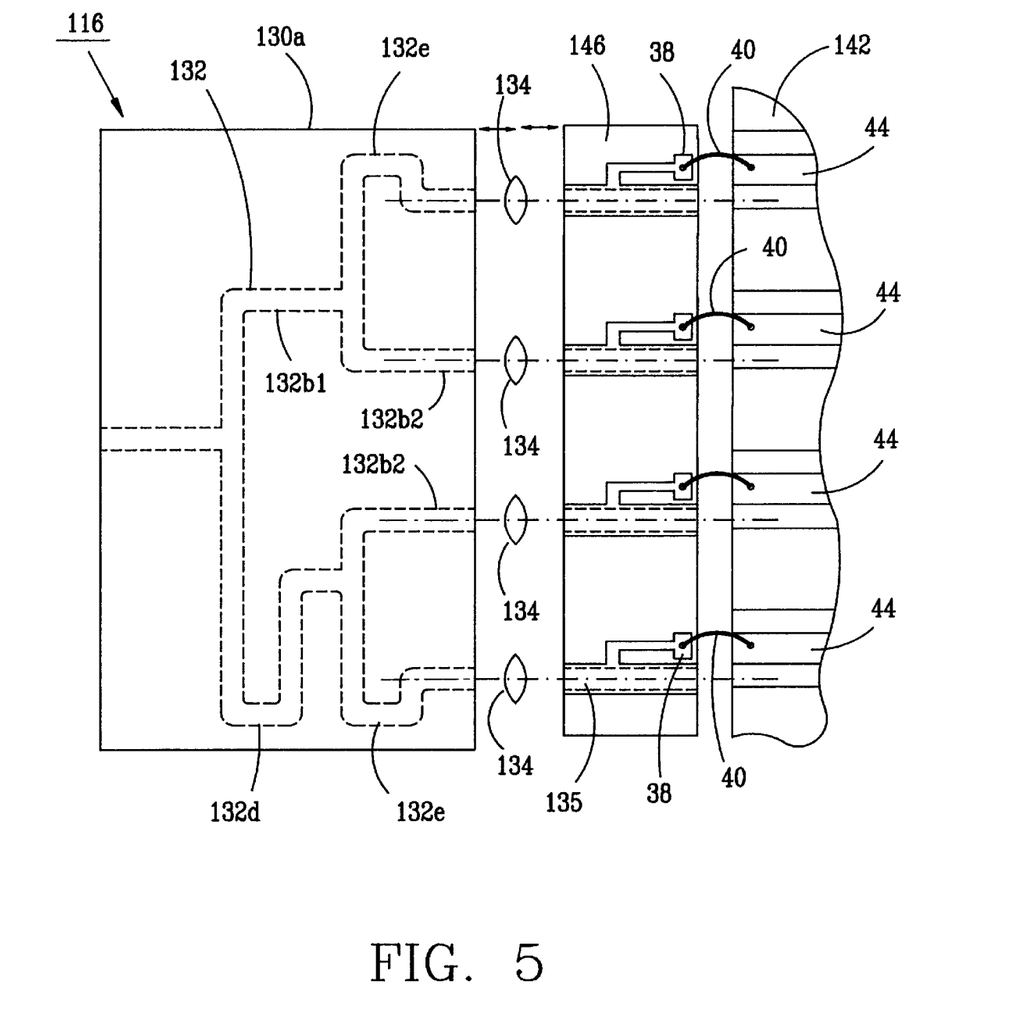
FIG. 5 is a schematic plan view of a fourth embodiment according to the invention.

The fourth embodiment of the invention is illustrated in FIG. 5. In this embodiment, the optical transmitter has a unitary modulator array 146 which includes, for example, two pairs of DPEA modulators on the same substrate. The optical waveguides 135 of the modulators are formed in parallel. The optical coupler 116 is integrated into the coupler modified in order to correspond to the modulator array unit 146.

The optical coupler 116 employs a PLC substrate 130a which integrates optical delay circuits therein. The coupler 116 splits signals exiting the second port 14b of an optical circulator (not shown in FIG. 5) in two stages into four signals. The coupler 116 is formed by an optical waveguide 132 with one delay section 132d and one nondelay section 132b1 in a first stage and two delay sections 132e and two nondelay sections 132b2 in a following second stage, so that the four split signals reach the DPEA modulators with different timing.

Between the PLC substrates 130a and the modulator array unit 146, a required number of lenses 134 is provided for the DPEA modulator elements.

The modulator array unit 146 and PLC substrates 130a are designed so that their optical axes are aligned within a tolerance. Thus, in an assemble process, alignment of the outer two optical axes automatically aligns the others. After the alignment within the tolerance, the optical axes are adjustable with the lenses 134. Thus, it easy to align the optical axes in assembling the components.

<The fifth embodiment>

Figure 6:
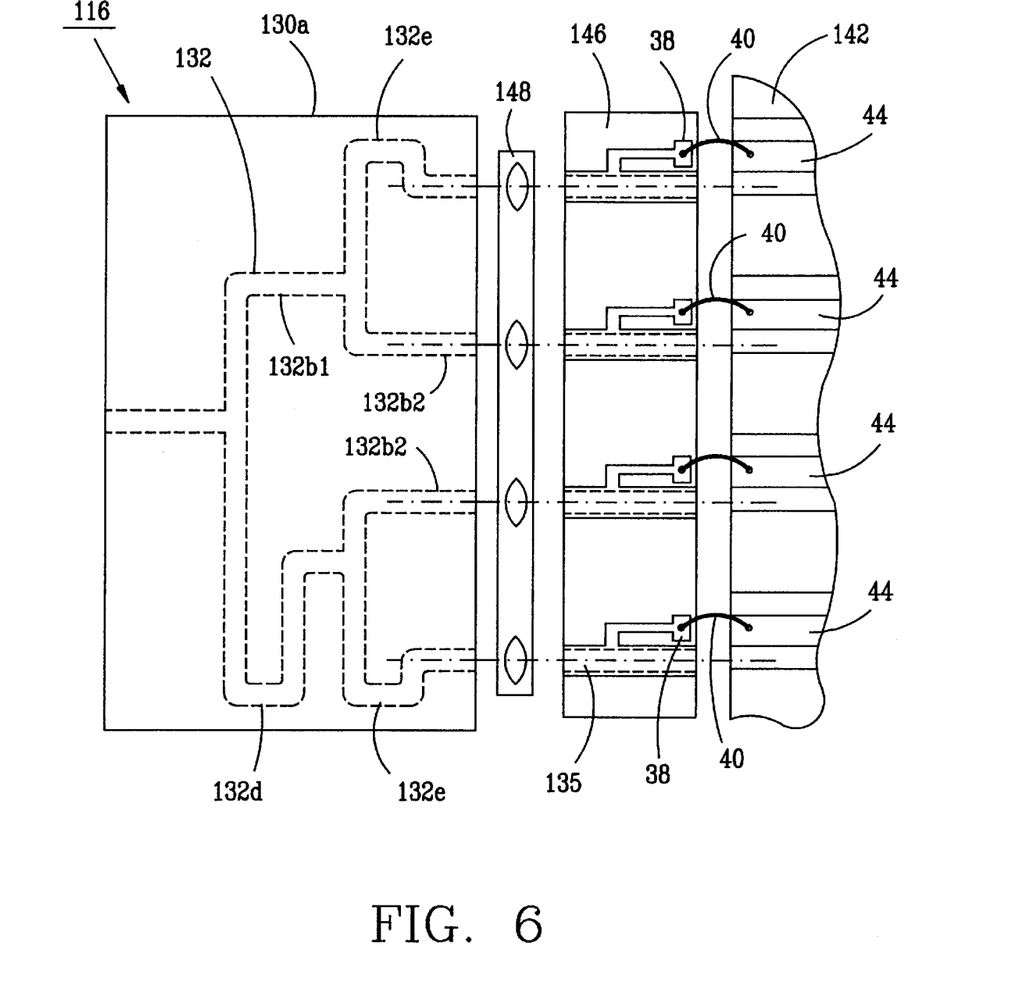
FIG. 6 is a schematic plan view of a fifth embodiment according to the invention.

The fifth embodiment of the invention is illustrated in FIG. 6. This embodiment is substantially the same as the fourth embodiment except that instead of the separate positioned lenses 134, the optical transmitter has a lens array unit 148 whereby the focus of the lens is adjusted in parallel. The distance between the center of each lens and the modulator array unit 146 is the same. Further, the distance between the center of each lens and the PLC substrate 130a is the same.

The modulator array unit 146, the PLC substrate 130a and the lens array unit 148 are designed to have their optical axes aligned within a tolerance. Thus, in the assembly process, alignment to the outer two optical axes automatically aligns the others. After such alignment the optical axes are adjustable with the lens array unit 148. Thus, it is easy to align the optical axes in assembling the components In the fifth embodiment, much space is not required for moving each lens to adjust the optical axes. As a result, it is possible to shorten the distance between lenses, thereby to make the module more compact.

As described above, since the optical transmitter 10 employs DP (double-pass) EA modulators for modulating signals, it is possible to make the module smaller than a conventional one. Moreover, as a result of employing DPEA modulators, component assembly is simplified.

Additional advantages of the above-described optical transmitters of the invention may now be described.

Whereas the conventional transmitter has two optical couplers and several lenses at the inputs and outputs of the modulators, only one optical coupler and fewer lenses are required for the various embodiments of the invention. Since the optical transmitter of the invention requires fewer optical components, fewer optical alignments are required. Moreover, the length of the optical delay circuit disposed between the coupler and modulators in the first, second and third embodiments is only half that required in the conventional optical transmitter.

Since DP (double-pass) EA modulators are employed to provide signal modulation in all of the embodiments, fewer optical components are needed than those which rely on the single pass LiNbO$_3$ modulators. Thus, it is possible to make the module compact, especially in the case of a multi-tap module such as in the fourth and fifth embodiments. The reduced number of components also makes it easy to position the DC bias supply substrate(s) adjacent to the EA modulators. In addition, fewer optical fibers between optical components are needed, so that connection losses are reduced.

While the invention has been described with reference to five embodiments thereof, it will be understood by those skilled in the art that modifications thereof can be made without departing from the spirit and scope of the invention, and the invention includes all such modifications and variations, the scope of the invention to be limited only by the appended claims. For example, in alternative embodiments, the arrangements shown in FIGS. 2–4 may be modified to form the delay circuit as an optical waveguide, or an optical filter, or as part of the waveguide portion 32c.

What is claimed is:

1. An optical time-division multiplexing transmitter module including
    an optical circulator having an input/output port and an output port,
    an optical coupler positioned to receive and split into two split signals a pulse beam signal output from the input/output port of the circulator,
    first and second double-pass electro-absorption (DPEA) modulators positioned respectively to receive and modulate one and the other of the two split signals, and reflect the modulated signals back to the coupler so that the coupler multiplexes the reflected signals and directs the multiplexed signals to the input/output port of the circulator, the circulator guiding the multiplexed signal received through the input/output port to the output port so as to exit the circulator; and
    an optical delay circuit positioned in the path of one of the two split signals so as to delay the one of the two split signals relative to the other of the two split signal.

2. An optical time-division multiplexing transmitter module, comprising:
    an optical circulator, having a circulator input/output port and a circular output port, the circulator guiding an optical signal in the form of a pulse beam to exit the circulator through the circulator input/output port;
    an optical coupler having a first coupler port and two second coupler ports, the coupler being positioned so that the signal exiting the circulator through the circulator input/output port is received by the coupler through the first coupler port, the coupler splitting into two split signals the signal received by the coupler through the first coupler port and guiding the two split signals to exit the coupler through respectively one and the other of the two second coupler ports;
    first and second double-pass electro-absorption modulators positioned respectively to receive the one and the other of the two split signals exiting the coupler through the two second coupler ports, modulating the received one and other of the split signals, and reflecting the modulated signals back through the coupler to the circulator input/output port, the coupler receiving the reflected signals through the one and the other of the two second coupler ports and multiplexing the received reflected signals and directing the multiplexed signals to the second circulator port via the first coupler port, the circulator receiving the multiplexed signals through the second circulator input/output port and guiding the received multiplexed signals to exit the circulator through the circulator output port; and
    an optical delay circuit positioned between the circulator and the modulators so as to delay the one of the two split signals.

3. An optical time-division multiplexing transmitter module, comprising:
    an optical circulator, having a circulator input/output port and a circulator output port, the circulator guiding an optical signal in the form of a pulse beam to exit the circulator through the circulator input/output port;
    an optical coupler having a first coupler port and two second coupler ports, the coupler being positioned so that the signal exiting the circulator through the circulator input/output port is received by the coupler through the first coupler port, the coupler splitting into two split signals the signal received by the coupler through the first coupler port and guiding the two split signals to exit the coupler through respectively one and the other of the two second coupler ports;
    first and second double-pass electro-absorption modulators positioned respectively to receive the one and the other of the two split signals exiting the coupler through the two second coupler ports, modulating the received one and other of the split signals, and reflecting the modulated signals back through the coupler to the circulator input/output port, the coupler receiving the reflected signals through the one and the other of the two second coupler ports and multiplexing the received reflected signals and directing the multiplexed signals to the second circulator port via the first coupler port, the circulator receiving the multiplexed signals through the second circulator input/output port and guiding the received multiplexed signals to exit the circulator through the circulator output port; and
    an optical delay circuit disposed in the coupler so as to delay the one of the two split signals before exiting the coupler through the one of the second coupler ports.

4. An optical time-division multiplexing transmitter module, comprising:
    an optical signal generator for generating a first optical signal;
    an optical circulator having a first port coupled to said optical signal generator, a second port and a third port, wherein said optical circulator receives the first optical signal from said optical signal generator at the first port thereof and outputs the first optical signal from the second port thereof, and wherein said optical circulator receives a second optical signal at the second port thereof and outputs the second optical signal from the third port thereof;

an optical coupler having a first port coupled to the second port of said optical circulator, a second port and a third port, where said optical coupler splits an optical signal received at the first port thereof into first and second split signals that are output from the second and third ports thereof, respectively, and wherein said optical coupler transfers optical signals received at the second and third ports thereof, and outputs the received signals from the first port thereof;

a first optical double-pass electro-absorption modulator coupled to the second port of said optical coupler, said first modulator modulating an optical signal received thereto and reflecting the modulated signal;

a delay circuit coupled to the third port of the optical coupler; and a second optical double-pass electrode-absorption modulator coupled to said delay circuit, said second modulator modulating an optical signal received thereto and reflecting the modulated signal.

5. An optical time-division multiplexing transmitter module according to claim 4, wherein said optical signal generator includes a laser diode and an electro-absorption modulator.

6. An optical time-division multiplexing transmitter module according to claim 5, wherein the laser diode is a distributed-feedback laser diode.

7. An optical time-division multiplexing transmitter module according to claim 4, further comprising an optical amplifier coupled to the third port of said optical circulator.

8. An optical time-division multiplexing transmitter module according to claim 4, wherein said first and second optical modulators receive external electric signals for synchronously controlling their modulating, respectively.

9. An optical time-division multiplexing transmitter module according to claim 4, wherein the second port of said optical coupler and said first optical modulator are arranged along a first optical axis through a lens, and wherein the third port of said optical coupler, said delay circuit and said second optical modulator are arranged along a second optical axis through a plurality of lenses, respectively.

10. An optical time-division multiplexing transmitter module according to claim 4, wherein each of said first and second optical modulators includes
an optical waveguide;
a conductive line formed over the waveguide; and
a bonding pad electrically connected to the conductive line, said bonding pad being connected to a DC bias supply substrate for supplying a DC voltage.

11. An optical time-division multiplexing transmitter module according to claim 10, wherein the DC bias supply substrate is located in a plane of the optical axes.

12. An optical time-division multiplexing transmitter module according to claim 10, wherein the bonding pads of said first and second optical modulators are connected to separate DC bias supply substrates, respectively.

13. An optical time-division multiplexing transmitter module, comprising:
an optical signal generator for generating a first optical signal;
an optical circulator having a first port coupled to said optical signal generator, a second port and a third port, wherein said optical circulator receives the first optical signal from said optical signal generator at the first port thereof and outputs the first optical signal from the second port thereof, and wherein said optical circulator receives a second optical signal at the second port thereof and outputs the second optical signal from the third port thereof;

an optical coupler having a first port coupled to the second port of said optical circulator, a second port and a third port, where said optical coupler splits an optical signal received at the first port thereof into first and second split signals that are output from the second and third ports thereof, respectively, and wherein said optical coupler transfers optical signals received at the second and third ports thereof, and outputs the received signals from the first port thereof;

a first optical double-pass electro-absorption modulator modulating an optical signal received thereby and reflecting the modulated signal, said first modulator aligned with the second port of said optical coupler along a first optical axis, said first modulator separated by a first distance from the second port of said optical coupler along the first optical axis;

a lens disposed between and coupling said first optical modulator and the second port of said optical coupler, along the first optical axis;

a second optical double-pass electro-absorption modulator modulating an optical signal received thereby and reflecting the modulated signal, said second modulator aligned with the third port of said optical coupler along a second optical axis, said second modulator separated from the third port of said optical coupler by a second distance longer than the first distance, along the second optical axis; and a further lens disposed between and coupling said second optical modulator and the third port of said optical coupler, along the second optical axis.

14. An optical time-division multiplexing transmitter module according to claim 13, wherein said first and second optical modulators receive external electric signals for synchronously controlling their modulating, respectively.

15. An optical time-division multiplexing transmitter module according to claim 13, wherein each of said first and second optical modulators includes
an optical waveguide;
a conductive line formed over the waveguide; and
a bonding pad electrically connected to the conductive line, said bonding pad being connected to a DC bias supply substrate for supplying a DC voltage.

16. An optical time-division multiplexing transmitter module according to claim 15, wherein the DC bias supply substrate is located in a plane of the optical axes.

17. An optical time-division multiplexing transmitter module according to claim 15, wherein the bonding pads of said first and second optical modulators are connected to separate DC bias supply substrates, respectively.

18. An optical time-division multiplexing transmitter module, comprising:
an optical signal generator for generating a first optical signal;
an optical circulator having a first port coupled to said optical signal generator, a second port and a third port, wherein said optical circulator receives the first optical signal from said optical signal generator at the first port thereof and outputs the first optical signal from the second port thereof, and wherein said optical circulator receives a second optical signal at the second port thereof and outputs the second optical signal from the third port thereof;

an optical coupler having a first port coupled to the second port of said optical circulator, a second port and a third port, said optical coupler having
  a first optical waveguide having a first length, formed between the first and second ports thereof, and
  a second optical waveguide, having a second length that is longer than the first length, formed from the first and third ports thereof,
said optical coupler splitting an optical signal received at the first port thereof into first and second split signals that are output from the second and third ports thereof, respectively, wherein said optical coupler transfers optical signals received at the second and third ports thereof, and outputs the received signals from the first port thereof;
  a first optical double-pass electro-absorption modulator modulating an optical signal received thereby and reflecting the modulated signal, said first modulator aligned with the second port of said optical coupler along a first optical axis, said first modulator separated by a set distance from the second port of said optical coupler along the first optical axis;
  a lens disposed between and coupling said first optical modulator and the second port of said optical coupler, along the first optical axis;
  a second optical double-pass electro-absorption modulator modulating an optical signal received thereby and reflecting the modulated signal, said first modulator aligned with the third port of said optical coupler along a second optical axis, said second modulator separated from the third port of said optical coupler by the first distance, along the second optical axis; and
  a further lens disposed between and coupling said second optical modulator and the third port of said optical coupler, along the second optical axis.

19. An optical time-division multiplexing transmitter module according to claim 18, wherein said first and second optical modulators receive external electric signals for synchronously controlling their modulating, respectively.

20. An optical time-division multiplexing transmitter module according to claim 18, wherein each of said first and second optical modulators includes
  an optical waveguide;
  a conductive line formed over the waveguide; and
  a bonding pad electrically connected to the conductive line, said bonding pad being connected to a DC bias supply substrate for supplying a DC voltage.

21. An optical time-division multiplexing transmitter module according to claim 20, wherein the DC bias supply substrate is located in a plane of the optical axes.

22. An optical time-division multiplexing transmitter module according to claim 20, wherein the bonding pads of said first and second optical modulators are connected to separate DC bias supply substrates, respectively.

23. An optical time-division multiplexing transmitter module according to claim 18, wherein said optical coupler further has a fourth port, a fifth port, a third optical waveguide having a third length formed between the first and fourth ports and a fourth optical waveguide having a fourth length that is longer than the third length, formed from the first and fifth ports, and where said module further comprises
  a third optical double-pass electro-absorption modulator modulating an optical signal received thereby and reflecting the modulated signal, wherein the fourth port of said optical coupler and said third optical modulator are arranged along a third optical axis, separated by a first distance;
  a lens coupling the fourth port of said optical coupler and said third optical modulator along the third optical axis;
  a fourth optical double-pass electro-absorption modulator modulating an optical signal received thereby and reflecting the modulated signal, wherein the fifth port of said optical coupler and said fourth optical modulator are arranged along a fourth optical axis separated by the first distance; and
  a further lens coupling the fifth port of said optical coupler and said fourth optical modulator along the fourth optical axis.

* * * * *